(12) United States Patent
Kumei

(10) Patent No.: US 11,217,804 B2
(45) Date of Patent: Jan. 4, 2022

(54) FUEL CELL SYSTEM

(71) Applicant: TOYOTA JIDOSHA KABUSHIKI KAISHA, Toyota (JP)

(72) Inventor: Hideyuki Kumei, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 262 days.

(21) Appl. No.: 16/601,931

(22) Filed: Oct. 15, 2019

(65) Prior Publication Data

US 2020/0153011 A1 May 14, 2020

(30) Foreign Application Priority Data

Nov. 9, 2018 (JP) .............................. JP2018-211409

(51) Int. Cl.
| | |
|---|---|
| H01M 8/04 | (2016.01) |
| H01M 8/04746 | (2016.01) |
| H01M 8/04828 | (2016.01) |
| H01M 8/249 | (2016.01) |
| H01M 8/04119 | (2016.01) |

(52) U.S. Cl.
CPC ..... H01M 8/04753 (2013.01); H01M 8/0494 (2013.01); H01M 8/04164 (2013.01); H01M 8/249 (2013.01)

(58) Field of Classification Search
CPC ......... H01M 8/04753; H01M 8/04164; H01M 8/0494; H01M 8/249
See application file for complete search history.

(56) References Cited

U.S. PATENT DOCUMENTS

| | | | | |
|---|---|---|---|---|
| 8,871,403 | B2* | 10/2014 | Makita | H01M 8/04559 429/456 |
| 10,193,175 | B2* | 1/2019 | Poirot-Crouvezier | H01M 8/04201 |
| 10,854,899 | B2* | 12/2020 | Shapiro | H01M 8/249 |
| 11,069,912 | B2* | 7/2021 | Ito | H01M 8/04141 |
| 2002/0177018 | A1* | 11/2002 | Fuglevand | H01M 8/04589 429/432 |
| 2005/0164054 | A1 | 7/2005 | Wheat et al. | |

(Continued)

FOREIGN PATENT DOCUMENTS

| | | |
|---|---|---|
| JP | 2005-209648 | 8/2005 |
| JP | 2006-155997 | 6/2006 |
| JP | 2008-192614 | 8/2008 |

*Primary Examiner* — Amanda C. Walke
(74) *Attorney, Agent, or Firm* — Finnegan, Henderson, Farabow, Garrett & Dunner, LLP

(57) ABSTRACT

A fuel cell system includes: first and second injectors; first and second ejectors; a first circulation passage configured to circulate anode gas that has passed the first ejector between the first fuel cell and the first ejector; a second circulation passage configured to circulate the anode gas that has passed the second ejector between the second fuel cell and the second ejector; a communication passage communicating with the first and second circulation passages; a switching valve configured to switch the communication passage to a communication state where the first and second circulation passages communicate with each other or to a cutoff state where the first and second circulation passages are cut off; and a controller configured to scavenge the first fuel cell by injecting the anode gas with the first injector, while the first fuel cell stops power generation in the communication state.

8 Claims, 6 Drawing Sheets

(56) References Cited

U.S. PATENT DOCUMENTS

| | | | |
|---|---|---|---|
| 2008/0182138 A1 | 7/2008 | Salvador et al. | |
| 2010/0136377 A1* | 6/2010 | Park | H01M 8/0488 |
| | | | 429/454 |
| 2011/0003221 A1* | 1/2011 | Mizuno | H01M 8/04559 |
| | | | 429/429 |
| 2015/0125772 A1* | 5/2015 | Matsusue | H01M 8/04611 |
| | | | 429/432 |
| 2015/0372329 A1* | 12/2015 | Jomori | H01M 4/92 |
| | | | 429/432 |
| 2017/0358809 A1* | 12/2017 | Saito | H01M 8/04201 |
| 2018/0219238 A1* | 8/2018 | Tanaka | H01M 8/04716 |
| 2019/0006689 A1* | 1/2019 | Nada | H01M 16/006 |
| 2019/0036140 A1* | 1/2019 | Okuyoshi | H01M 8/04231 |
| 2020/0144652 A1* | 5/2020 | Ito | H01M 8/0488 |
| 2020/0403256 A1* | 12/2020 | Itou | H01M 8/04417 |
| 2020/0403257 A1* | 12/2020 | Itou | H01M 8/04671 |
| 2021/0143459 A1* | 5/2021 | Ikeda | H01M 8/04932 |
| 2021/0226232 A1* | 7/2021 | Onishi | H01M 8/04089 |
| 2021/0226234 A1* | 7/2021 | Takahashi | H01M 8/04753 |

\* cited by examiner

FUEL CELL SYSTEM

INCORPORATION BY REFERENCE

The disclosure of Japanese Patent Application No. 2018-211409 filed on Nov. 9, 2018 including the specification, drawings and abstract is incorporated herein by reference in its entirety.

BACKGROUND

1. Technical Field

The present disclosure relates to a fuel cell system.

2. Description of Related Art

When electric power generation stops while liquid water remains in a fuel cell, circulation of reactant gas may be hindered next time the electric power generation is started. Accordingly, a technique for scavenging the fuel cell to discharge liquid water from the fuel cell is known. For example, in Japanese Patent Application Publication No. 2008-192614, a fuel cell is scavenged by an injector injecting anode gas while electric power generation in the fuel cell is stopped.

SUMMARY

In order to sufficiently scavenge a fuel cell, it is desirable to inject a large amount of anode gas from an injector. Accordingly, there is a fuel cell system including a circulation passage for circulating the anode gas discharged from the fuel cell to the fuel cell again. When a large amount of anode gas is injected in such a system for the purpose of scavenging, the anode gas may remain without being consumed since electric power generation of the fuel cell is stopped. Consequently, the pressure inside the circulating passage may rise, as a result of which the pressure inside the fuel cell may become high enough to affect the fuel cell. Therefore, in the fuel cell system including a circulation passage for circulating anode gas, it may be hard to sufficiently scavenge the fuel cell, since scavenging can be performed only in the range where the pressure of the fuel cell does not become too high.

The present disclosure provides a fuel cell system capable of sufficiently scavenging the fuel cell.

An aspect of the present disclosure relates to a fuel cell system including: first and second fuel cells; first and second injectors; first and second ejectors; a first circulation passage; a second circulation passage; a communication passage; a switching valve; and a controller. The first and second injectors are configured to inject anode gas to be supplied to the first and second fuel cells. The first and second ejectors are configured to allow the anode gas injected from the first and second injectors to pass through the first and second ejectors respectively. The first circulation passage is configured to circulate the anode gas that has passed the first ejector between the first fuel cell and the first ejector. The second circulation passage is configured to circulate the anode gas that has passed the second ejector between the second fuel cell and the second ejector. The communication passage communicates with the first and second circulation passages. The switching valve is configured to be opened and closed to switch the communication passage to a communication state where the first and second circulation passages communicate with each other or to a cutoff state where the first and second circulation passages are cut off. The controller is configured to scavenge the first fuel cell by injecting the anode gas with the first injector, while the first fuel cell stops electric power generation in the communication state.

Since the first and second circulation passages communicate with each other, the anode gas injected by the first injector flows not only to the first circulation passage and the inside of the first fuel cell, but also to the second circulation passage and the inside of the second fuel cell. This makes it possible to restrain a rising speed of pressure inside the first fuel cell caused by injection of the anode gas from the first injector. Accordingly, the amount of anode gas supplied into the first fuel cell can be secured to achieve sufficient scavenging of the first fuel cell.

The controller may be configured to scavenge the first fuel cell, while the second fuel cell generates electric power in the communication state.

The controller may be configured to scavenge the first fuel cell, while the second fuel cell generates electric power in the communication state, with driving of the second injector being stopped.

The fuel cell system may include first and second exhaust valves communicating with the first and second circulation passages through outside air, respectively. The controller may be configured to scavenge the first fuel cell, while at least one of the first and second exhaust valves is opened in the communication state.

The controller may be configured to scavenge the first fuel cell, while the second fuel cell generates electric power in the communication state, with the second exhaust valve being opened.

The fuel cell system may include a first gas-liquid separator configured to allow the anode gas discharged from the first fuel cell to pass through the first gas-liquid separator until the anode gas reaches the first ejector. The communication passage may have a first end portion connected between the first gas-liquid separator and the first ejector in the first circulation passage.

The controller may be configured to scavenge the second fuel cell by injecting the anode gas with the second injector, while the second fuel cell stops the electric power generation in the communication state.

The fuel cell system may include a second gas-liquid separator configured to allow the anode gas discharged from the second fuel cell to pass through the second gas-liquid separator until the anode gas reaches the second ejector. The communication passage may have a second end portion connected between the second gas-liquid separator and the second ejector in the second circulation passage.

The fuel cell system capable of sufficiently scavenging the fuel cell can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a timing chart showing an example of scavenging control when an ignition is turned on;

FIG. 3 is a flowchart showing an example of the scavenging control when the ignition is turned on;

DETAILED DESCRIPTION OF EMBODIMENTS

Configuration of Fuel Cell System

Figure 1:
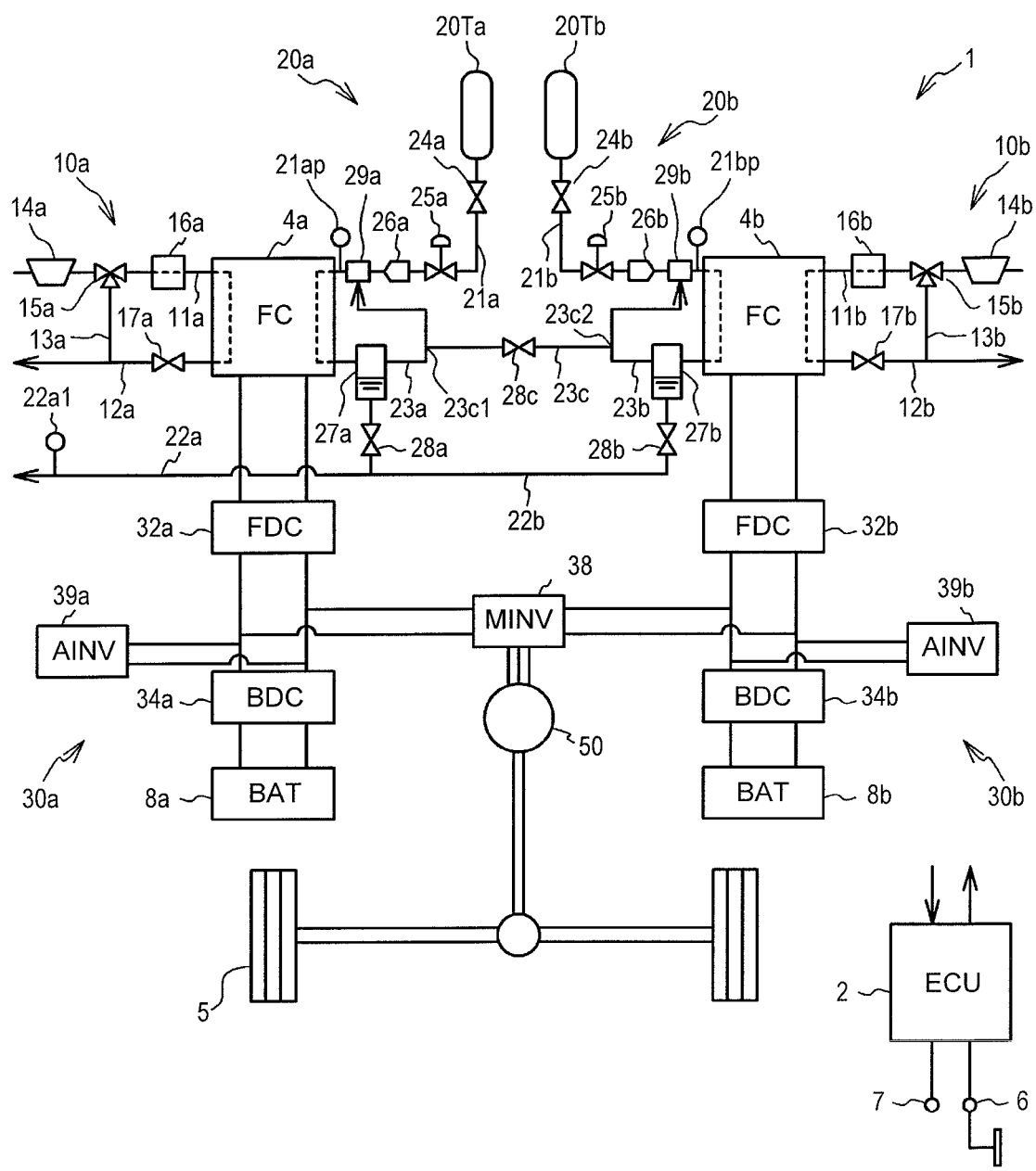
FIG. 1 is a block diagram of a fuel cell system mounted on a vehicle.

FIG. 1 is a block diagram of a fuel cell system (hereinafter simply referred to as system) 1 mounted on a vehicle. The systems 1 includes an electronic control unit (ECU) 2, fuel cells (hereinafter, referred to as FCs) 4a, 4b, secondary batteries (hereinafter, referred to as BATs) 8a, 8b, cathode gas supply systems 10a, 10b, anode gas supply systems 20a, 20b, electric power control systems 30a, 30b, and a motor 50. The system 1 includes an unshown cooling system for cooling the FCs 4a, 4b through circulation of coolant.

The FCs 4a, 4b are fuel cells that generate electric power upon receiving supply of cathode gas and anode gas. In the present embodiment, air containing oxygen is used as cathode gas, and hydrogen gas is used as anode gas. The FCs 4a, 4b are each formed from a stack of a plurality of solid polymer electrolyte single cells. Although the FCs 4a, 4b are identical and also identical in rated output in the present embodiment, the fuel cells are not limited to these. The FCs 4a, 4b are examples of the first and second fuel cells.

The cathode gas supply systems 10a, 10b supply the air containing oxygen as cathode gas to the FCs 4a, 4b, respectively. Specifically, the cathode gas supply systems 10a, 10b include supply pipes 11a, 11b, discharge pipes 12a, 12b, bypass pipes 13a, 13b, air compressors 14a, 14b, bypass valves 15a, 15b, intercoolers 16a, 16b, and backpressure valves 17a, 17b, respectively.

The supply pipes 11a, 11b are connected to cathode inlet manifolds of the FCs 4a, 4b, respectively. The discharge pipes 12a, 12b are connected to cathode outlet manifolds of the FCs 4a, 4b, respectively. The bypass pipe 13a communicates with the supply pipe 11a and the discharge pipe 12a. Similarly, the bypass pipe 13b communicates with the supply pipe 11b and the discharge pipe 12b. The bypass valve 15a is provided in a joint portion between the supply pipe 11a and the bypass pipe 13a. Similarly, the bypass valve 15b is provided in a joint portion between the supply pipe 11b and the bypass pipe 13b. The bypass valve 15a switches a communication state between the supply pipe 11a and the bypass pipe 13a. Similarly, the bypass valve 15b switches a communication state between the supply pipe 11b and the bypass pipe 13b. The air compressor 14a, the bypass valve 15a, and the intercooler 16a are disposed on the supply pipe 11a in order from the upstream side. The backpressure valve 17a is disposed in a portion on the discharge pipe 12a that is on the upstream side of a joint portion between the discharge pipe 12a and the bypass pipe 13a. Similarly, the air compressor 14b, the bypass valve 15b, and the intercooler 16b are disposed on the supply pipe 11b in order from the upstream side. The backpressure valve 17b is disposed in a portion on the discharge pipe 12b that is on the upstream side of a joint portion between the discharge pipe 12b and the bypass pipe 13b.

The air compressors 14a, 14b supply air that contains oxygen as cathode gas to the FCs 4a, 4b through the supply pipes 11a, 11b, respectively. The cathode gas supplied to the respective FCs 4a, 4b is discharged through the corresponding discharge pipes 12a, 12b. The intercoolers 16a, 16b cool the cathode gas supplied to the FCs 4a, 4b, respectively. The backpressure valves 17a, 17b regulate the backpressure on the cathode side of the FCs 4a, 4b, respectively.

The anode gas supply systems 20a, 20b supply hydrogen gas as anode gas to the FCs 4a, 4b, respectively. Specifically, the anode gas supply systems 20a, 20b include tanks 20Ta, 20Tb, supply pipes 21a, 21b, discharge pipes 22a, 22b, return pipes 23a, 23b, tank valves 24a, 24b, pressure-regulating valves 25a, 25b, injectors (hereinafter referred to as INJs) 26a, 26b, gas-liquid separators 27a, 27b, exhaust valves 28a, 28b, and ejectors 29a, 29b, respectively. The anode gas supply systems 20a, 20b share a communication pipe 23c and a switching valve 28c.

In each of the tanks 20Ta, 20Tb, hydrogen gas that is anode gas is stored in a high-pressure state. The tank 20Ta and an anode inlet manifold of the FC 4a is connected through the supply pipe 21a. Similarly, the tank 20Tb and an anode inlet manifold of the FC 4b is connected through the supply pipe 21b. The tank 20Ta, 20Tb store hydrogen gas that is anode gas. The discharge pipes 22a, 22b are connected to anode outlet manifolds of the FCs 4a, 4b, respectively. The return pipes 23a, 23b communicate with the gas-liquid separators 27a, 27b and the supply pipes 21a, 21b, respectively.

The tank valve 24a, the pressure-regulating valve 25a, the INJ 26a, and the ejector 29a are disposed in order from the upstream side of the supply pipe 21a. While the tank valve 24a is opened, the opening degree of the pressure-regulating valve 25a is regulated, and the INJ 26a injects anode gas. Accordingly, the anode gas passes the ejector 29a and is supplied to the FC 4a. An ECU 2 controls driving of the tank valve 24a, the pressure-regulating valve 25a, and the INJ 26a. The ECU 2 also controls the tank valve 24b, the pressure-regulating valve 25b, the INJ 26b, and the ejector 29b. The INJs 26a, 26b are examples of the first and second injectors that inject the anode gas to be supplied to the FCs 4a, 4b. The ejectors 29a, 29b are examples of the first and the second ejectors that allow the anode gas injected from the INJs 26a, 26b to pass through the ejectors 29a, 29b, respectively. Between the FC 4a and the ejector 29a in the supply pipe 21a, a pressure sensor 21ap is provided for detecting the pressure (hereinafter referred to as anode pressure) in an anode gas passage formed in the FC 4a. A pressure sensor 21bp is also provided in a similar manner.

The discharge pipe 22a has the gas-liquid separator 27a and the exhaust valve 28a disposed in order from the upstream side. The gas-liquid separator 27a separates water from the anode gas discharged from FC 4a and stores the separated water. The water stored in the gas-liquid separator 27a is discharged out of the system 1 through the discharge pipe 22a, when the exhaust valve 28a is opened. The ECU 2 controls driving of the exhaust valve 28a. The ECU 2 also controls the gas-liquid separator 27b and the exhaust valve 28b. The discharge pipe 22b is connected in the middle of the discharge pipe 22a. More specifically, when the exhaust valve 28b is opened, the water stored in the gas-liquid separator 27b is discharged out of the system 1 through the discharge pipes 22b, 22a. The discharge pipe 22a is equipped with a hydrogen concentration sensor 22a1 that detects hydrogen concentration of the gas passing through the discharge pipe 22a.

The return pipe 23a is a pipeline for refluxing the anode gas discharged from the FC 4a to the FC 4a. The return pipe 23a has an upstream-side end portion connected to the gas-liquid separator 27a, and a downstream-side end portion connected to the ejector 29a. The ejector 29a sucks the anode gas, discharged from the FC 4a, from the return pipe 23a by using a flow of the anode gas injected from the INJ 26a as a driving flow, and recirculates the anode gas discharged from the FC 4a to the FC 4a. Therefore, a region of the supply pipe 21a on the downstream side of the ejector 29a, a region of the discharge pipe 22a on the upstream side of the gas-liquid separator 27a, and the return pipe 23a are examples of the circulation passage for circulating the anode gas that has passed the ejector 29a between the FC 4a and the ejector 29a. Similarly, a region of the supply pipe 21b on the downstream side of the ejector 29b, a region of the discharge pipe 22b on the upstream side of the gas-liquid separator 27b, and the return pipe 23b are examples of the circulation passage for circulating the anode gas that has passed the ejector 29b between the FC 4b and the ejector 29b.

The communication pipe 23c has one end 23c1 connected to the return pipe 23a, and the other end 23c2 connected to the return pipe 23b. The communication pipe 23c is equipped with a switching valve 28c that opens and closes the communication pipe 23c. When the switching valve 28c is closed, the return pipes 23a, 23b are put in a cut-off state. When the switching valve 28c is opened, the return pipes 23a, 23b are put in a communication state through the communication pipe 23c, that is, the above-stated two circulation passages are put in a communication state. Hereinafter, in the specification, the term "communication state" is simply defined as the state where the above-stated two circulation passages communicate with each other due to the switching valve 28c being opened. The communication pipe 23c is an example of the communication passage that causes the first and second circulation passages to communicate with each other. The one end 23c1 and the other end 23c2 of the communication pipe 23c are examples of the first and second end portions. The details will be described later.

The electric power control systems 30a, 30b include fuel cell DC-DC converters (hereinafter, referred to FDCs) 32a, 32b, battery DC-DC converters (hereinafter, referred to as BDCs) 34a, 34b, and auxiliary-machine inverters (hereinafter referred to as AINVs) 39a, 39b, respectively. The electric power control systems 30a, 30b share a motor inverter (hereinafter referred to as MINV) 38 connected to the motor 50. The FDCs 32a, 32b regulate direct-current electric power from the FCs 4a, 4b, respectively, and outputs the regulated electric power to the MINV 38. The BDCs 34a, 34b regulate direct-current electric power from the BATs 8a, 8b, respectively, and output the regulated electric power to the MINV 38. The electric power generated in the FCs 4a, 4b can be stored in the BATs 8a, 8b, respectively. The MINV 38 converts the input direct-current electric power into three-phase alternating-current electric power, and supplies the converted electric power to the motor 50. The motor 50 drives the wheel 5 to allow a vehicle to travel.

The electric power of the FC 4a and the BAT 8a can be supplied to load apparatuses other than the motor 50 through the AINV 39a. Similarly, the electric power of the FC 4b and the BAT 8b can be supplied to load apparatuses through the AINV 39b. Here, the load apparatuses include auxiliary machines for the FCs 4a, 4b, and auxiliary machines for a vehicle. The auxiliary machines for the FCs 4a, 4b include the air compressors 14a, 14b, the bypass valves 15a, 15b, the backpressure valves 17a, 17b, the tank valves 24a, 24b, the pressure-regulating valves 25a, 25b, the INJs 26a, 26b, and exhaust valves 28a, 28b described above. The auxiliary machines for a vehicle include air conditioning equipment, a lighting apparatus, a hazard lamp, and the like, for example.

The ECU 2 includes a central processing unit (CPU), a read only memory (ROM), and a random access memory (RAM). The ECU 2 is electrically connected to an accelerator operation amount sensor 6, an ignition switch 7, the air compressors 14a, 14b, the bypass valves 15a, 15b, the backpressure valves 17a, 17b, the tank valves 24a, 24b, the pressure-regulating valves 25a, 25b, the INJs 26a, 26b, exhaust valves 28a, 28b, the switching valve 28c, the FDCs 32a, 32b, the BDCs 34a, 34b, the pressure sensors 21ap, 21bp, and the hydrogen concentration sensor 22a1. The ECU 2 calculates a request output to the entire FCs 4a, 4b based on a detection value of the accelerator operation amount sensor 6. In accordance with the request output, the ECU 2 controls the auxiliary machines for the FCs 4a, 4b, or the like, to control total electric power generated in the FCs 4a, 4b.

Scavenging Control

The ECU 2 executes scavenging control that scavenges the FCs 4a, 4b by supplying scavenging gas into the FCs 4a, 4b, in order to discharge liquid water remaining in the FCs 4a, 4b, when the ignition is turned on and when the ignition is turned off. When the scavenging control is executed when the ignition is turned on, the liquid water remaining in the FCs 4a, 4b can be discharged before power generation is started. Accordingly, output performance can be secured when power generation is started after the scavenging operation. When the scavenging control is executed when the ignition is turned off, the liquid water generated during electric power generation can be discharged from the FCs 4a, 4b. This makes it possible to prevent the liquid water remaining in the FCs 4a, 4b from freezing during the stop of the system 1. In the scavenging control of the present embodiment, anode gas is used to scavenge the anode gas passage in each of the FCs 4a, 4b.

Scavenging Control when Ignition is Turned on

Figure 2:
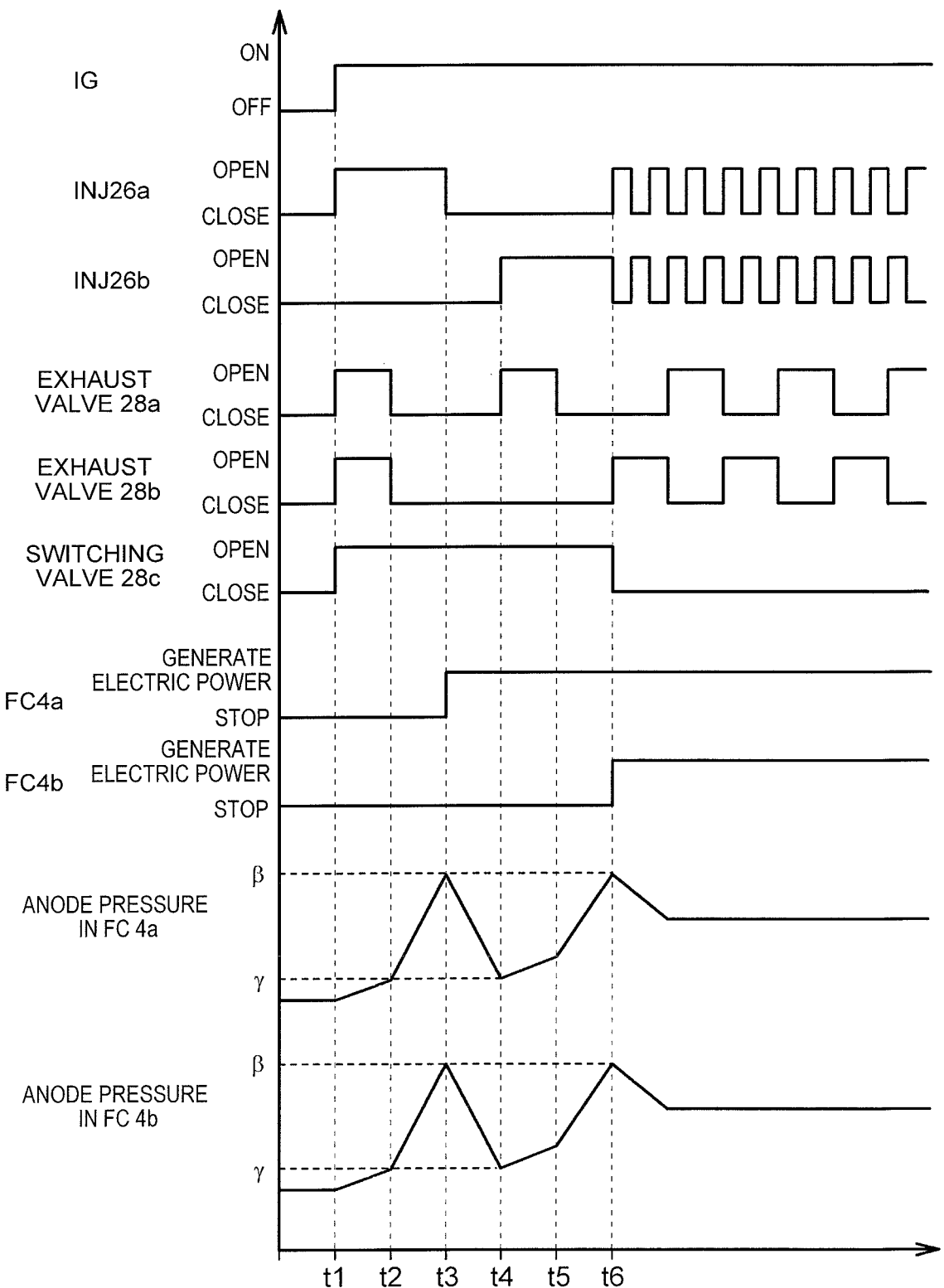
Figure 3:
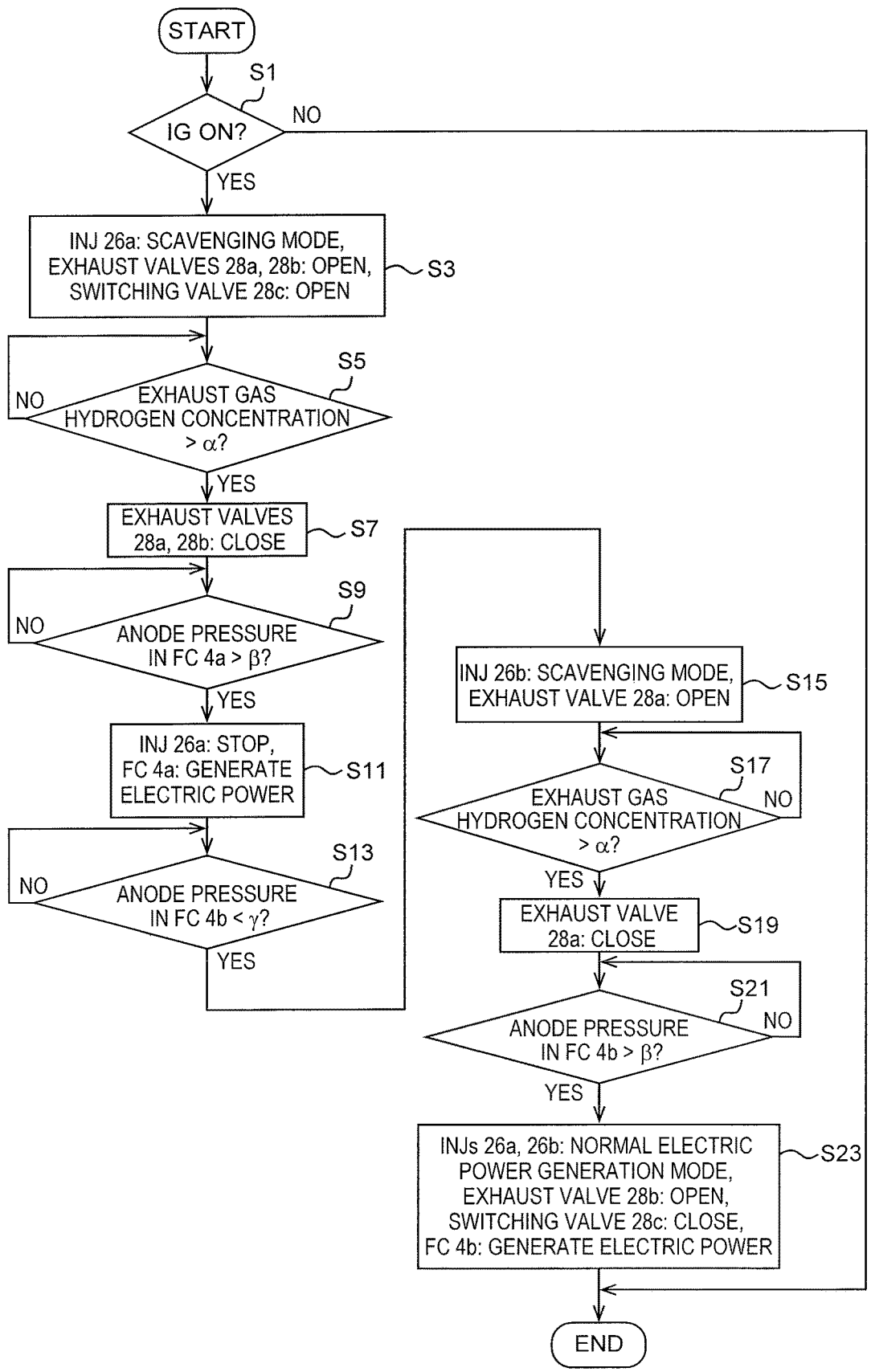

FIG. 2 is a timing chart showing an example of scavenging control when the ignition is turned on. FIG. 2 shows an opening-closing state of the INJs 26a, 26b, an opening-closing state of the exhaust valves 28a, 28b, an opening-closing state of the switching valve 28c, a power generation state of the FCs 4a, 4b, and anode pressure in the FCs 4a, 4b. FIG. 3 is a flowchart showing an example of the scavenging control when the ignition is turned on. The ECU 2 repeatedly executes the scavenging control when the ignition is turned on. In the state where the ignition is turned off, the tank valves 24a, 24b, the exhaust valves 28a, 28b, and the switching valve 28c are closed, and the FCs 4a, 4b are in a power generation stop state.

The ECU 2 determines whether or not the ignition turned-on is detected based on an output signal from the ignition switch 7 (step S1). When determination result in step S1 is No, the present control ends. When the ignition turned-on is detected (Yes in step S1), the ECU 2 drives the INJ 26a in a scavenging mode to start scavenging of the FC 4a, while opening the exhaust valves 28a, 28b and the switching valve 28c (step S3, time t1). For example, the INJ 26a, the exhaust valve 28a, and the switching valve 28c are driven based on the electric power charged from the BAT 8a, and for example, the exhaust valve 28b is driven based on the electric power charged from the BAT 8b. However, the present disclosure is not limited to this configuration.

In the scavenging mode, the INJ 26a is kept in an opened state, so that anode gas is continuously injected. Since the communication state is provided by the switching valve 28c being opened as described above, at least some of the anode gas injected by the INJ 26a also flows to the side of the anode gas supply system 20b through the communication pipe 23c. Hence, even when the anode gas is continuously injected by the INJ 26a for the purpose of scavenging the FC 4a in the communication state, a rising speed of anode pressure in the FCs 4a, 4b is restrained to be lower than the rising speed of anode pressure in the FC 4a when the switching valve 28c is closed. Furthermore, when both the exhaust valves 28a, 28b are opened in the communication state, water stored in the gas-liquid separators 27a, 27b or some of the gas remaining in the FCs 4a, 4b, the return pipes 23a, 23b, or the like, is discharged out of the system 1. This also restrains the rising speed of anode pressure in the FCs 4a, 4b. Thus, when the FC 4a is scavenged in the state where the rising speed of anode pressure in the FCs 4a, 4b is restrained, a large amount of anode gas can be supplied to the FC 4a to achieve sufficient scavenging of the FC 4a.

Next, the ECU 2 waits until the hydrogen concentration of the exhaust gas discharged to the outside air becomes higher than a threshold $\alpha$ based on the hydrogen concentration sensor 22a1 (step S5). The threshold $\alpha$ is set to a concentration value within the range that does not deteriorate fuel efficiency due to hydrogen being discharged to the outside air. When the determination result of step S5 is Yes, the ECU 2 closes the exhaust valves 28a, 28b (step S7, time t2). As a result, it is possible to restrain that the gas with high hydrogen concentration is discharged out of the system 1, and to thereby restrain deterioration of fuel efficiency. When the exhaust valves 28a, 28b are closed, the rising speed of anode pressure in the FCs 4a, 4b increases.

Next, the ECU 2 waits until the anode pressure in the FC 4a becomes higher than a threshold $\beta$ based on the pressure sensor 21ap (step S9). The threshold $\beta$ is set to a pressure value lower by a prescribed margin than a pressure value that may cause a problem in the fuel cell due to the anode pressure becoming too high. Although the threshold $\beta$ is set to, for example, 300 kPa, the threshold $\beta$ is not limited to this.

When determining that the anode pressure in the FC 4a is higher than the threshold $\beta$ (Yes in step S9), the ECU 2 completes scavenging of the FC 4a by stopping driving of the INJ 26a, while starting electric power generation in the FC 4a (step S11, time t3). Since electric power generation in the FC 4a is started without injection of anode gas from the INJ 26a, the anode gas present in the FCs 4a, 4b, or the like, is consumed, and the anode pressure in the FCs 4a, 4b can be lowered. Since anode gas is already supplied to the FC 4a in scavenging operation, electric power generation in the FC 4a is started by driving the air compressor 14a to supply cathode gas to the FC 4a, and electrically connecting the FC 4a with the load apparatuses with a switch provided in the FDC 32a. Therefore, electric power generation in the FC 4a can swiftly be started after the completion of scavenging.

Next, the ECU 2 waits until the anode pressure in the FC 4b becomes less than a threshold $\gamma$ based on the pressure sensor 21bp (step S13). The threshold $\gamma$ is set to a pressure value suitable for starting scavenging of the FC 4b, the pressure value indicating that the anode pressure in the FC 4b is sufficiently lowered. The threshold $\gamma$ is 120 kPa, for example.

When the determination result in step S13 is Yes, the ECU 2 starts scavenging of the FC 4b by driving the INJ 26b in a scavenging mode, while opening the exhaust valve 28a (step S15, time t4). When the exhaust valve 28a is opened, nitrogen gas generated due to electric power generation in the FC 4a can be discharged, while the rising speed of anode pressure in the FCs 4a, 4b, relating to injection of the anode gas from the INJ 26b for the purpose of scavenging the FC 4b, can also be restrained. Furthermore, since the FC 4a generates electric power in the state where driving of the INJ 26a is stopped as described above, anode gas is consumed by electric power generation in the FC 4a. With this, the rising speed of anode pressure in the FCs 4a, 4b can also be restrained. Thus, in the state where the rising speed of anode pressure in the FCs 4a, 4b is restrained, a larger amount of anode gas can be supplied to the FC 4b to achieve sufficient scavenging. Although the INJ 26b is driven based on the electric power charged from the BAT 8b, and the exhaust valve 28a is driven based on the electric power generated in the FC 4a, the present disclosure is not limited to this configuration.

Next, the ECU 2 waits until the hydrogen concentration of the exhaust gas becomes higher than the threshold $\alpha$ based on the hydrogen concentration sensor 22a1 (step S17). When the determination result of step S17 is Yes, the ECU 2 closes the exhaust valve 28a (step S19, time t5). As a result, the rising speed of anode pressure in the FCs 4a, 4b increases.

Next, the ECU 2 waits until the anode pressure in the FC 4b becomes higher than the threshold $\beta$ based on the pressure sensor 21bp (step S21). When the determination result in step S21 is Yes, the ECU 2 completes scavenging of the FC 4b by driving the INJs 26a, 26b in a normal electric power generation mode and starting electric power generation in the FC 4b as well as in the FC 4a, opens the exhaust valve 28b, and closes the switching valve 28c (step S23).

In the normal electric power generation mode, when the INJs 26a, 26b are intermittently opened and closed, desirable amounts of anode gas corresponding to request outputs to the FCs 4a, 4b are supplied to the FCs 4a, 4b, respectively. When the switching valve 28c is closed, communication between the return pipes 23a, 23b is cut off, and the FCs 4a, 4b can be shifted to the normal electric power generation state. When the exhaust valve 28b is opened, electric power generation in the FC 4b can be started while the pressure in the FC 4b is swiftly lowered. Since anode gas is already supplied to the FC 4b in scavenging operation as in the case of the FC 4a, electric power generation in the FC 4b is started by driving the air compressor 14b to supply cathode gas to the FC 4b, and electrically connecting the FC 4b with the load apparatuses with a switch provided in the FDC 32b. After the INJs 26a, 26b shift to the normal electric power generation mode, opening and closing control of the exhaust valves 28a, 28b is performed in accordance with respective power generation amounts of the FCs 4a, 4b, and the water stored in the gas-liquid separators 27a, 27b is discharged.

As described in the foregoing, when anode gas is injected from the INJs 26a, 26b in the communication state to scavenge the respective FCs 4a, 4b, the increase in anode pressure in the FCs 4a, 4b can be restrained, while supply flow rates of the anode gas to the FCs 4a, 4b can be secured to achieve sufficient scavenging of the FCs 4a, 4b.

Although there are a plurality of apparatuses to be controlled in steps S3, S7, S11, S15, and S23, it is not necessarily needed to drive these apparatuses at the same time in each step. For example, in step S3, the INJ 26a may be driven in a scavenging mode after the exhaust valves 28a, 28b and the switching valve 28c are opened. In step S11, electric power generation in the FC 4a may be started while the INJ 26a is continuously driven.

In step S3, both the exhaust valves 28a, 28b are opened. However, only one of the exhaust valves 28a, 28b may be opened as long as in the communication state. This is because the rising speed of pressure in the FCs 4a, 4b can still be restrained by opening one of the exhaust valves 28a, 28b.

From a viewpoint of restraining the rising speed of anode pressure in the FCs 4a, 4b in step S15, both the exhaust valves 28a, 28b may be opened instead of only the exhaust valve 28a. However, it is desirable to open only the exhaust valve 28a in step S15. In step S15, the FC 4a generates electric power, and scavenging is started in the FC 4b. Accordingly, an outlet peripheral portion of the FC 4a is filled with nitrogen gas with low hydrogen concentration that is generated by electric power generation, whereas an outlet peripheral portion of the FC 4b is filled with anode gas with high hydrogen concentration injected for scavenging of the FC 4b. Hence, when the exhaust valve 28b on the FC 4b side is opened, the hydrogen concentration of the exhaust gas may become higher than the threshold α in short time. As a result, the determination result in step S17 may become Yes, and the exhaust valve 28b may be closed in short time. To cope with this situation, the exhaust valve 28a on the FC 4a side is opened. As a result, the nitrogen gas with low hydrogen concentration can be discharged, and the exhaust valve 28a can be opened for a long time, so that the rising speed of anode pressure in the FCs 4a, 4b can be restrained.

Although the anode pressure in the FC 4a is detected based on the pressure sensor 21ap in step S9, the anode pressure in the FC 4b based on the pressure sensor 21bp may be used instead of the anode pressure in the FC 4a. This is because in the communication state, the anode pressure in the FC 4a and the anode pressure in the FC 4b become substantially equal. In steps S13 and S21, the anode pressure in the FC 4a may similarly be used instead of the anode pressure in the FC 4b. In steps S13 and S21, a cell voltage of the FC 4a may be used instead of the anode pressure in the FC 4b. This is because the anode pressure and the cell voltage of the fuel cell are correlated. That is, in steps S13 and S21, the FC 4a is already generating electric power, and as the anode pressure in the FCs 4a, 4b becomes lower in the communication state, the cell voltage of the FC 4a also becomes lower. In step S9, the ECU 2 may wait until a prescribed time elapses after scavenging is started, and then may execute the process of step S11. In that case, the prescribed time is the time shorter by a prescribed margin than the time when the anode pressure in the fuel cell may become high enough to cause a problem in the fuel cell due to continuous scavenging. This also applies to step S21.

As shown in FIG. 1, one end 23c1 of the communication pipe 23c is connected to the return pipe 23a. Consequently, for example, while the FC 4a generates electric power and the FC 4b is scavenged in the communication state, the water generated by electric power generation in the FC 4a is stored in the gas-liquid separator 27a. Therefore, the water generated in the FC 4a is restrained from entering into the return pipe 23b and affecting the scavenging of the FC 4b.

Scavenging Control when Ignition is Turned Off

Figure 4:
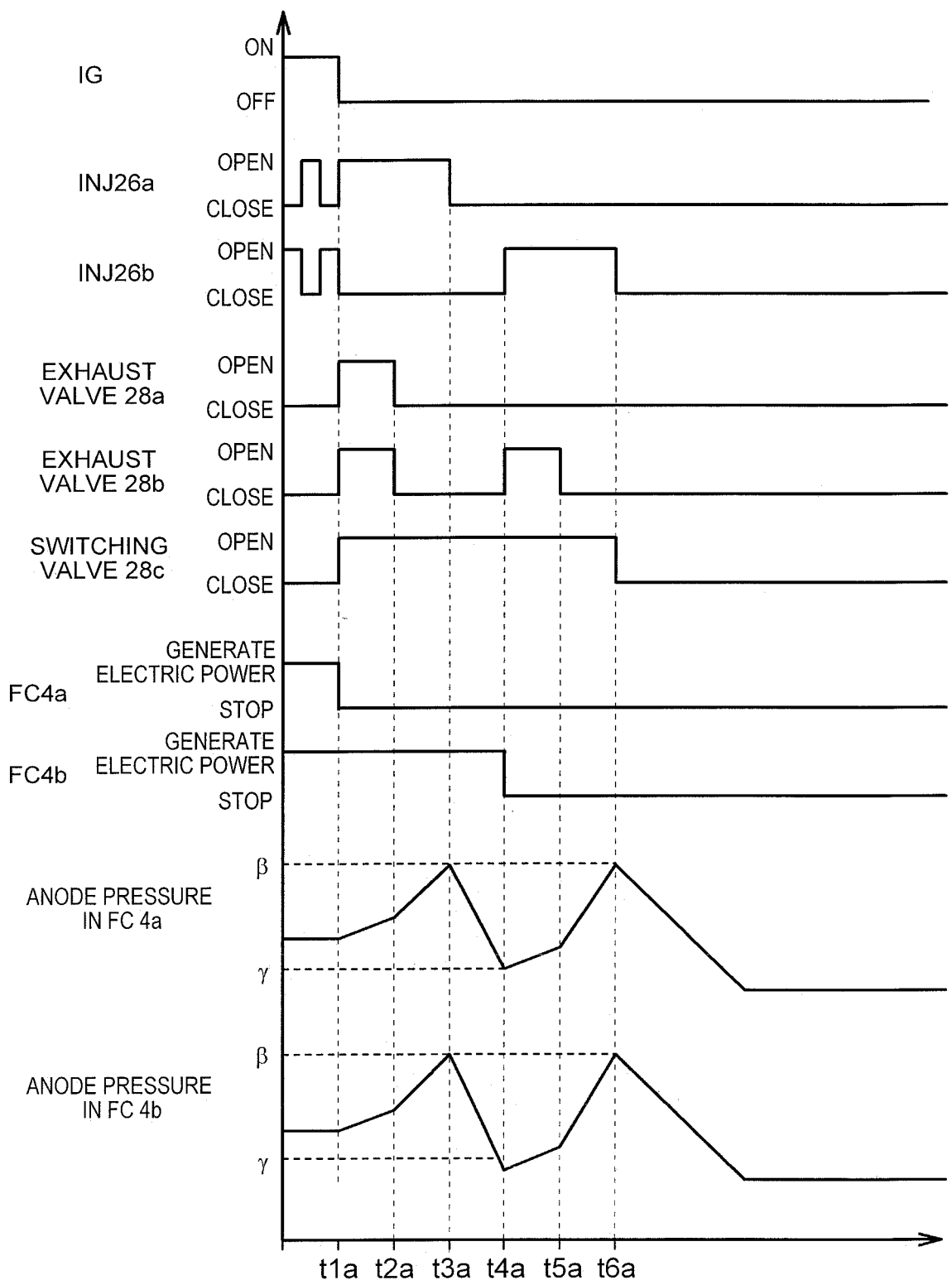
FIG. 4 is a timing chart showing an example of the scavenging control when the ignition is turned off.
Figure 5:
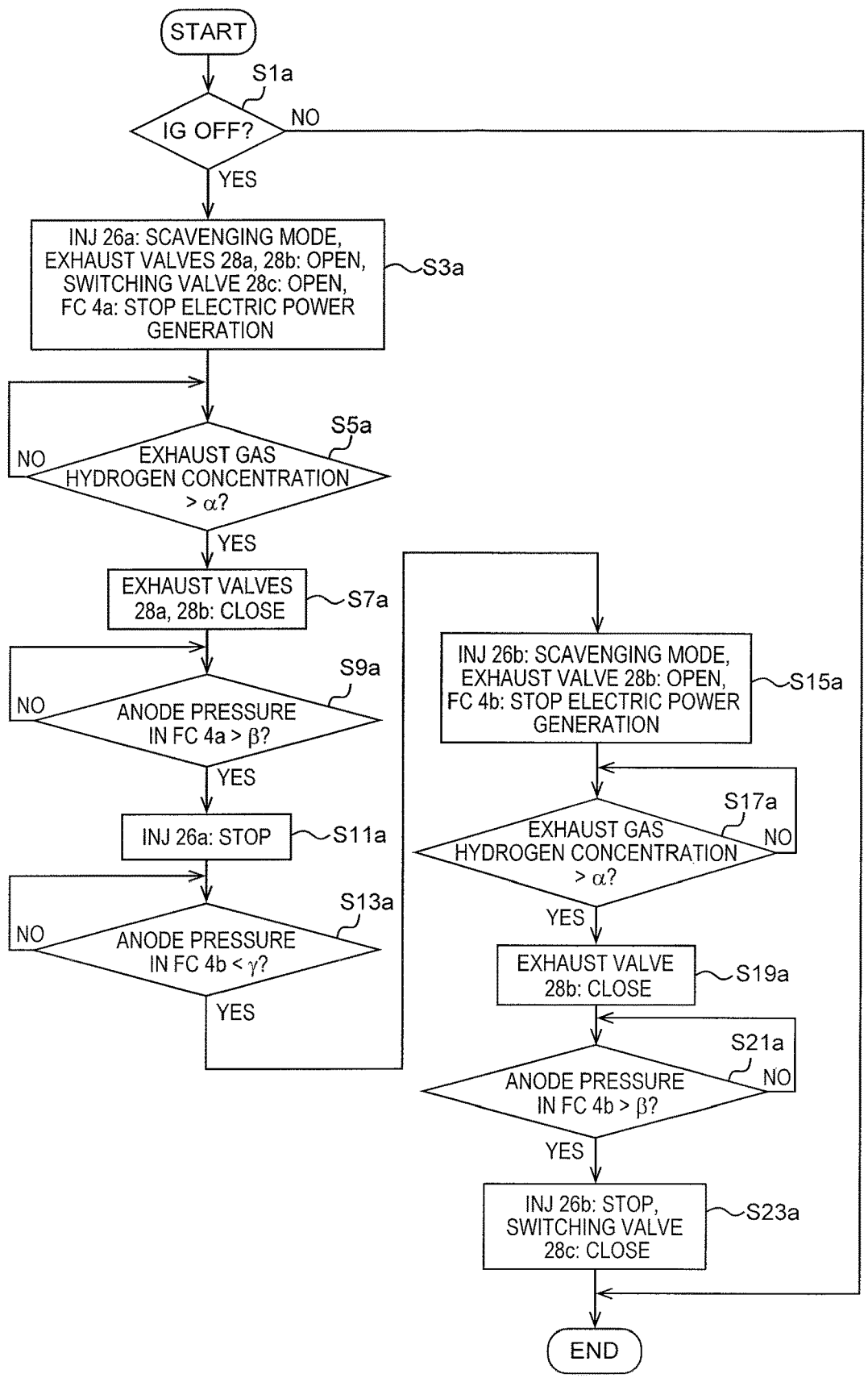
FIG. 5 is a flowchart showing an example of the scavenging control when the ignition is turned off.

FIG. 4 is a timing chart showing an example of scavenging control when the ignition is turned off. FIG. 4 shows an opening-closing state of the INJs 26a, 26b, an opening-closing state of the exhaust valves 28a, 28b, an opening-closing state of the switching valve 28c, a power generation state of the FCs 4a, 4b, and anode pressure in the FCs 4a, 4b. FIG. 5 is a flowchart showing an example of the scavenging control when the ignition is turned off. The scavenging control when the ignition is turned off is repeatedly executed in every specified period.

The ECU 2 determines whether or not the ignition turned-off is detected based on an output signal from the ignition switch 7 (step S1a). When determination result in step S1 is No, the present control ends. When the ignition turned-off is detected (Yes in step S1a), the ECU 2 drives the INJ 26a in a scavenging mode to start scavenging of the FC 4a, while opening the exhaust valves 28a, 28b and the switching valve 28c, and stopping electric power generation in the FC 4a (step S1a, time t1a). When the switching valve 28c is opened, the communication state is established, and in this communication state, scavenging of the FC 4a is performed. Hence, the FC 4a can sufficiently be scavenged, while increase in anode pressure in the FCs 4a, 4b is restrained. For example, the INJ 26a, the exhaust valve 28a, and the switching valve 28c are driven based on the electric power charged from the BAT 8a, and the exhaust valve 28b is driven based on the electric power generated in the FC 4b. However, the present disclosure is not limited to this configuration. The electric power generation in the FC 4a is stopped by cutting the electric connection between the FC 4b and the load apparatuses with a switch provided inside the FDC 32b.

Next, the ECU 2 waits until the hydrogen concentration of the gas discharged to the outside air becomes higher than the threshold α based on the hydrogen concentration sensor 22a1 (step S5a). When the determination result of step S5a is Yes, the ECU 2 closes the exhaust valves 28a, 28b (step S7a, time t2a). Next, the ECU 2 waits until the anode pressure in the FC 4a becomes higher than the threshold β based on the pressure sensor 21ap (step S9a). When the determination result of step is Yes in step S9a, the ECU 2 stops driving of the INJ 26a, and completes the scavenging of the FC 4a (step S11a, time t3a).

Next, the ECU 2 waits until the anode pressure in the FC 4b becomes less than the threshold γ (step S13a). When the determination result in step S13a is Yes, the ECU 2 starts scavenging of the FC 4b by driving the INJ 26b in a scavenging mode, while opening the exhaust valve 28b, and stopping electric power generation in the FC 4b (step S15a, time t4a). Since the FC 4b is scavenged in the communication state as described above, the FC 4b can sufficiently be scavenged. Although the INJ 26b and the exhaust valve 28b are driven based on, for example, electric power charged from the BAT 8b, the present disclosure is not limited to this configuration.

Next, the ECU 2 waits until the hydrogen concentration of the exhaust gas becomes higher than the threshold α based on the hydrogen concentration sensor 22a1 (step S17a). When the determination result of step S17a is Yes, the ECU 2 closes the exhaust valve 28b (step S19a, time t5a). The ECU 2 waits until the anode pressure in the FC 4b becomes higher than the threshold β based on the pressure sensor 21bp (step S21a). When the determination result of step S21a is Yes, the ECU 2 completes the scavenging of the FC 4b by stopping the INJ 26b, while closing the switching valve 28c (step S23a). After that, the anode pressure in the FCs 4a, 4b gradually lowers due to what is called a cross leakage.

As described in the foregoing, also at the time when the ignition is turned off, anode gas is injected from the INJs 26a, 26b in the communication state to scavenge the respective FCs 4a, 4b. Accordingly, the rising speed of anode pressure in the FCs 4a, 4b can be restrained, while the supply flow rates of the anode gas to the FCs 4a, 4b can be secured to achieve sufficient scavenging of the FCs 4a, 4b.

Although there are a plurality of apparatuses to be controlled in steps S3a, S7a, S15a, and S23a, it is not necessarily needed to drive these apparatuses at the same time in each step. In step S3a, as long as in the communication state, only one of the exhaust valves 28a, 28b may be opened. In step S15a, both the exhaust valves 28a, 28b may be opened. However, because of the same reason as in step S15 described above, it is preferable to open the exhaust valve 28b on the side of the FC 4b that is during electric power generation immediately before step S15a. In step S9a, the anode pressure in the FC 4b based on pressure sensor 21bp may be used instead of the anode pressure in the FC 4a. In steps S13a and S21a, the anode pressure in the FC 4a may be used instead of the anode pressure in the FC 4b. In steps S9a and S13a, the cell voltage of the FC 4b that is yet during electric power generation may be used instead of the anode pressure in the FC 4a. In step S9a, the ECU 2 may wait until a prescribed time elapses after scavenging is started, and then may execute the process of step S11a. This also applies to step S21a.

As shown in FIG. 1, the other end of the communication pipe 23c is connected to the return pipe 23b. Consequently, for example, while the FC 4b generates electric power and the FC 4a is scavenged in the communication state, the water generated by electric power generation in the FC 4b is stored in the gas-liquid separator 27b. Therefore, the water generated in the FC 4b is restrained from entering into the return pipe 23a and affecting the scavenging of the FC 4a.

When the ignition is turned on, and when the ignition is turned off, both the FCs 4a, 4b are scavenged. However, only one of the FCs 4a, 4b may be scavenged. In the case where both the FCs 4a, 4b are scavenged, the scavenging order is not particularly specified.

Modifications of Fuel Cell System

Figure 6A:
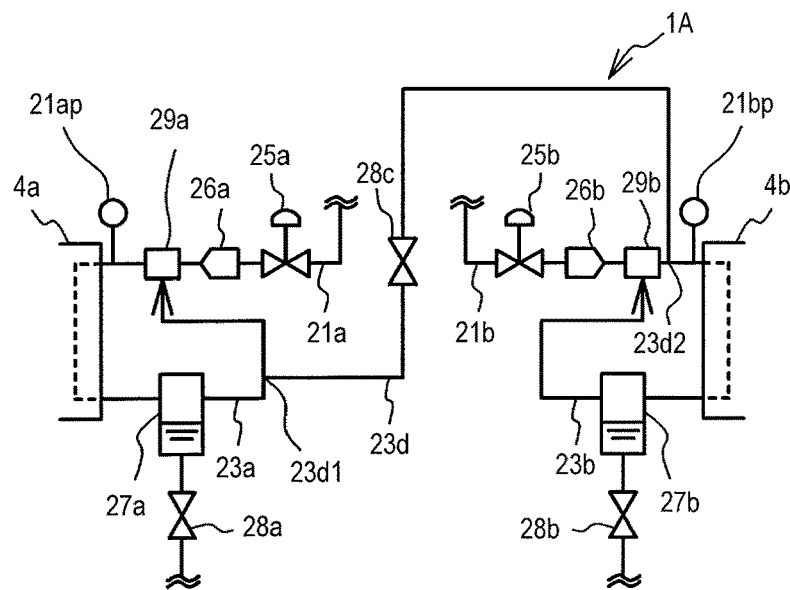
FIG. 6A is a schematic block diagram showing a system of a modification.
Figure 6B:
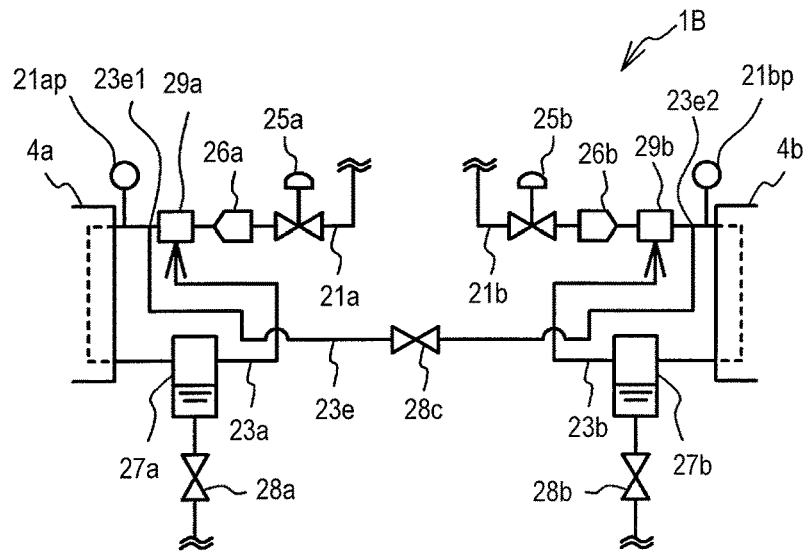
FIG. 6B is a schematic block diagram showing a system of another modification.
Figure 6C:
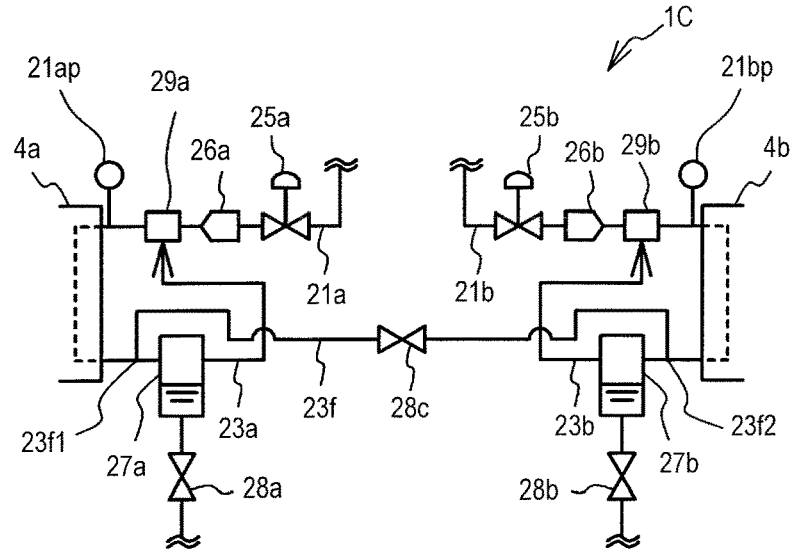
FIG. 6C is a schematic block diagram showing a system of yet another modification.

FIGS. 6A to 6C are schematic block diagrams showing systems 1A to 1C of modifications. Like component members are designated by like reference numerals to omit redundant description thereof. In the system 1A of FIG. 6A, a communication pipe 23d has one end 23d1 connected to the return pipe 23a as in the above-stated embodiment. However, the communication pipe 23d has the other end 23d2 connected between the ejector 29b and the FC 4b in the supply pipe 21b. In the system 1B of FIG. 6B, a communication pipe 23e has one end 23e1 connected between the ejector 29a and the FC 4a in the supply pipe 21a. The communication pipe 23e has the other end 23e2 connected between the ejector 29b and the FC 4b in the supply pipe 21b. In the system 1C of FIG. 6C, a communication pipe 23f has one end 23f1 connected between the FC 4a and the gas-liquid separator 27a in the discharge pipe 22a, and the other end 23f2 connected between the FC 4b and the gas-liquid separator 27b in the discharge pipe 22b. In addition, one end of the communication passage may be connected to the return pipe 23a, and the other end may be connected between the FC 4b and the gas-liquid separator 27b in the discharge pipe 22b. One end of the communication passage may be connected between the ejector 29a and the FC 4a in the supply pipe 21a, and the other end may be connected between the FC 4b and the gas-liquid separator 27b in the discharge pipe 22b. For example, one of the above-stated communication passages may be adopted in consideration of mount space, or the like, of a vehicle on which the system is mounted.

In the above embodiment and modifications, as shown in FIG. 1, the discharge pipe 22b has a downstream end connected to the discharge pipe 22a, such that exhaust gas from both the FCs 4a, 4b is discharged to the outside air through the discharge pipe 22a. However, the present disclosure is not limited to this configuration. In other words, the present disclosure may be configured such that the downstream end of the discharge pipe 22b is not connected to the discharge pipe 22a, and exhaust gas is directly discharged to the outside air. In this case, a concentration sensor is provided to detect the hydrogen concentration of the exhaust gas passing through the discharge pipe 22b. In steps S5 and S7, or steps S5a and S7a, the ECU 2 may determine whether or not the hydrogen concentration of the exhaust gas discharged from the respective discharge pipes 22a, 22b is higher than the threshold α. When the hydrogen concentration of the exhaust gas discharged from the discharge pipe 22a is higher than the threshold α, the exhaust valve 28a may be closed. When the hydrogen concentration of the exhaust gas discharged from the discharge pipe 22b is higher than the threshold α, the exhaust valve 28b may be closed.

In the above embodiment and modifications, the systems each include two FCs 4a, 4b, However, the systems may include three or more FCs. In a system including three or more FCs, at least circulation passages of two FCs may communicate with each other through a communication passage. However, from a viewpoint of sufficiently restraining the rising speed of anode pressure in the FCs due to scavenging, it is desirable that the circulation passages of three or more FCs communicate with each other. The circulation passages of three or more FCs may be configured to communicate with each other as shown below. For example, a main passage is provided to connect the circulation passages of two FCs, a branch passage or passages branching from the main passage are provided so as to be connected to respective circulation passages of the remaining FCs, and a switching valve capable of connecting and disconnecting between the main passage and the branch passages may also be provided.

In the embodiment and modifications, the BATs 8a, 8b correspond to the FCs 4a, 4b, respectively. However, the present disclosure is not limited to this configuration. The system may include a secondary battery commonly connected to the FCs 4a, 4b. In the embodiment disclosed, the system includes the tanks 20Ta, 20Tb corresponding to the FCs 4a, 4b, respectively. However, the present disclosure is not limited to this configuration. The system may include a tank shared by the FCs 4a, 4b instead of the tanks 20Ta, 20Tb, or may include three or more tanks.

A vehicle mounted with the fuel cell system is not limited to an automobile. Rather, the vehicle may include a two-wheeled vehicle, a rail car, a ship, and an airplane. The vehicle may also be a hybrid vehicle capable of using both a motor and an internal combustion engine for driving.

Although the preferred embodiments of the present disclosure have been described in detail, the present disclosure is not limited to such specific embodiments. Various modifications and changes may be possible without departing from the scope of the present disclosure.

What is claimed is:

1. A fuel cell system, comprising:
   first and second fuel cells;
   first and second injectors configured to inject anode gas to be supplied to the first and second fuel cells;
   first and the second ejectors configured to allow the anode gas injected from the first and second injectors to pass through the first and the second ejectors, respectively;
   a first circulation passage configured to circulate the anode gas that has passed the first ejector between the first fuel cell and the first ejector;

a second circulation passage configured to circulate the anode gas that has passed the second ejector between the second fuel cell and the second ejector;

a communication passage communicating with the first and second circulation passages;

a switching valve configured to be opened and closed to switch the communication passage to a communication state where the first and second circulation passages communicate with each other or to a cutoff state where the first and second circulation passages are cut off; and a controller configured to scavenge the first fuel cell by injecting the anode gas with the first injector, while the first fuel cell stops electric power generation in the communication state.

2. The fuel cell system according to claim 1, wherein the controller is configured to scavenge the first fuel cell, while the second fuel cell generates electric power in the communication state.

3. The fuel cell system according to claim 1, wherein the controller is configured to scavenge the first fuel cell, while the second fuel cell generates electric power in the communication state, with driving of the second injector being stopped.

4. The fuel cell system according to claim 1, further comprising first and second exhaust valves configured to communicate with the first and second circulation passages through outside air, respectively, wherein the controller is configured to scavenge the first fuel cell, while at least one of the first and second exhaust valves is opened in the communication state.

5. The fuel cell system according to claim 4, wherein the controller is configured to scavenge the first fuel cell, while the second fuel cell generates electric power in the communication state, with the second exhaust valve being opened.

6. The fuel cell system according to claim 1, further comprising a first gas-liquid separator configured to allow the anode gas discharged from the first fuel cell to pass through the first gas-liquid separator until the anode gas reaches the first ejector, wherein the communication passage has a first end portion connected between the first gas-liquid separator and the first ejector in the first circulation passage.

7. The fuel cell system according to claim 1, wherein the controller is configured to scavenge the second fuel cell by injecting the anode gas with the second injector, while the second fuel cell stops electric the power generation in the communication state.

8. The fuel cell system according to claim 7, further comprising a second gas-liquid separator configured to allow the anode gas discharged from the second fuel cell to pass through the second gas-liquid separator until the anode gas reaches the second ejector, wherein the communication passage has a second end portion connected between the second gas-liquid separator and the second ejector in the second circulation passage.

* * * * *